Sept. 13, 1960

L. J. SEMON 2,952,744

MONITOR CONTROL UNIT

Filed Oct. 17, 1958

INVENTOR.
LAWRENCE J. SEMON
BY Elliott & Pastoriza
ATTORNEYS

United States Patent Office 2,952,744
Patented Sept. 13, 1960

2,952,744

MONITOR CONTROL UNIT

Lawrence J. Semon, 918 Ocean Front, Santa Monica, Calif.

Filed Oct. 17, 1958, Ser. No. 767,934
5 Claims. (Cl. 179—42)

Figure 1:
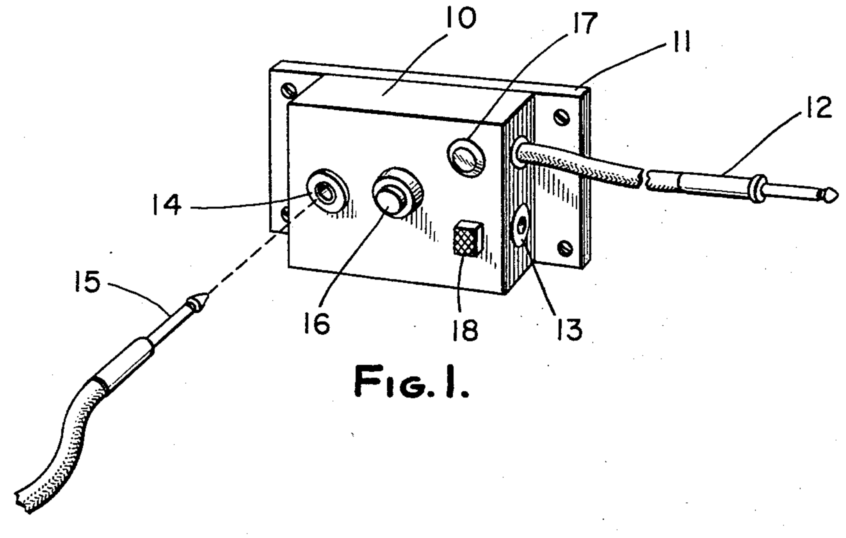

This invention relates generally to telephone equipment and more particularly to an improved monitor control unit for use in telephone answering services.

In a telephone answering service, an operator is provided with a central switchboard for receiving calls to a client in the event the client is not at home or in his office. Messages are taken and this information is communicated to the client when he calls in to the central office at a later time. In many instances, a client will leave a message with his answering service as to his whereabouts so that if a caller attempts to reach him, the answering service can make a direct connection between the incoming call and the particular telephone at the new location of the client.

Making a connection between an incoming call and a dialed out call at the central telephone answering switchboard is referred to in the art as "patching" and there is ordinarily provided for this purpose "jumper" leads for making the connection at the switchboard. However, it is essential that the jumper or connecting line be removed after the parties have completed their conversation as otherwise the telephone will remain tied up. It has thus been necessary in the past for the operator at the telephone answering service to periodically listen in to the "patched" line to determine whether or not conversation is still taking place. Such a procedure is not only time consuming and annoying to the parties, but can cause serious trouble in the event telephone lines are tied up longer than necessary.

Bearing the foregoing in mind, it is a primary object of the present invention to provide an improved connecting means or "patcher" cord for connecting an incoming call at an answering service to a dialed out call which will automatically apprise the operator when the conversation between the incoming caller and the other party is completed.

More particularly, it is an object to provide a device of the foregoing type which does not require any periodic checking by the operator but which will provide automatically an aural or visual signal or both when the call is completed so that the operator can attend to other matters, and the possibility of lines becoming inadvertently tied up is avoided.

An auxiliary object is to provide an improved "patching" cord which includes certain elements providing a filtering action to the end that improved transmission qualities of intelligence between the incoming call and the outgoing call is achieved.

Briefly, these and other objects and advantages of the invention are attained by providing a monitor control unit including input and output terminals for connection to an incoming call circuit and an outgoing call circuit, respectively. A transmission line is provided for carrying intelligence between the respective input and output terminals and includes serially connected condensers in combination with resistances for providing a high pass filtering action. In a preferred embodiment of the invention, the resistances constitute the resistances of relay coils which are in turn employed as control devices for actuating a suitable indicator such as a light or buzzer, or both in response to a change in voltage across the transmission line. Such a change in voltage will occur as a consequence of the voltage inherently available from an incoming call connection or an outgoing call connection. These voltages will fluctuate and sometimes reverse in polarity or at least be changed to a certain extent upon termination of the call by either party and the relay circuits are so designed as to effect energization of the indicator in response to a fluctuation or a change in such voltage.

The monitor control unit also includes a manually operable push button co-operating with the control circuit for apprising the operator that a proper connection has been made and establishing conditions under which the indicator will only subsequently operate at the time the call is actually completed.

Figure 2:
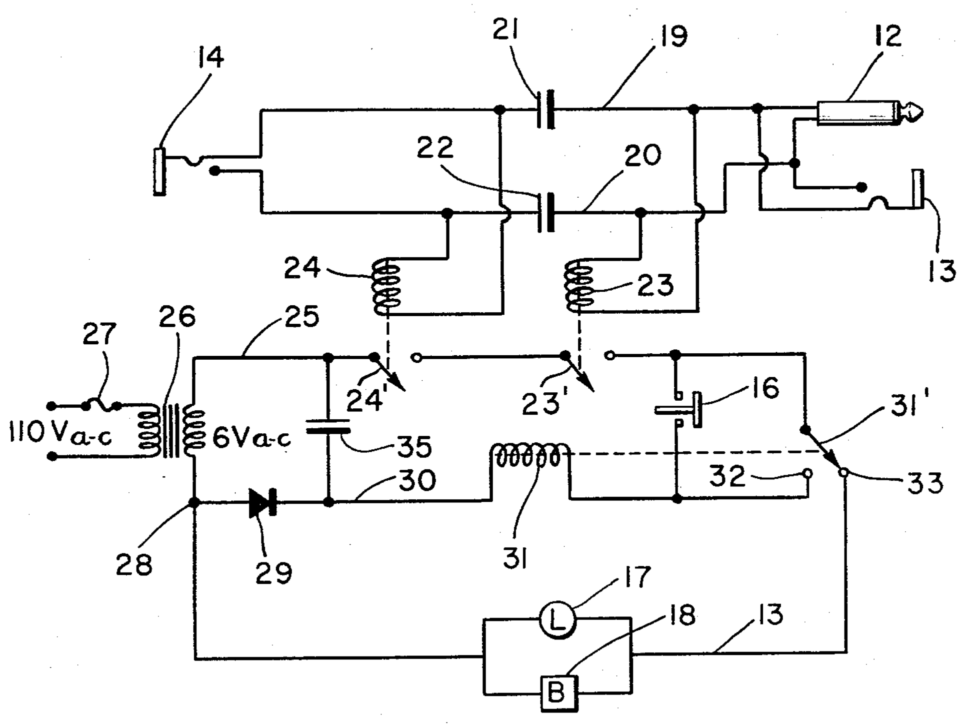

A better understanding of the invention will be had by referring to a preferred embodiment thereof as illustrated in the accompanying drawings, in which:

Figure 1 is a perspective view of the monitor control unit of this invention as it would be used in conjunction with a central switchboard at a telephone answering service; and, Figure 2 is a detailed schematic circuit diagram of the various connections and controls circuits within the unit illustrated in Figure 1.

Referring first to Figure 1, the unit is enclosed within a casing 10 adapted to be secured adjacent a telephone answering switchboard as by a rear bracket plate 11. The unit 10 includes an incoming call plug 12 as well as an incoming call jack 13 on one side, and an outgoing call jack 14 on the left hand portion of the face of the unit for connection to a plug 15. The plug 15 in turn is connected to a dialed out connecting jack on the switchboard (not shown).

On the front face of the unit 10 there is provided a push button 16 and an indicator which in the embodiment chosen for illustrative purposes includes both a light 17 and a buzzer 18.

As a specific example of the operation of the unit of Figure 1, assume that a patient should dial the telephone number of a doctor and the doctor is not at home so that the operator at the telephone answering service answers the call. If the operator at the answering service knows of the whereabouts of the doctor, she may then arrange to connect the incoming call of the patient directly to the doctor by dialing out to the doctor. The connection is then made by connecting the incoming call to either the plug 12 or the jack 13 and then connecting the plug 15 from the dialed out call to the jack 14.

When the foregoing connections are made, the indicator light 17 will light and buzzer 18 will sound indicating to the operator that the connection between the patient and doctor is complete and that conversation can take place. The operator then depresses the push button 16 which will serve to disconnect the light and buzzer from the circuit so that conversation can freely take place between the patient and doctor. When either the patient or doctor hangs up or terminates the call, the monitoring unit within the casing 10 is arranged to energize automatically the indicator light and buzzer so that the operator is then immediately apprised of the completion of the call and can quickly disconnect the plugs 12 and 15 thereby leaving the telephones free for subsequent calls.

The manner in which the foregoing operations are achieved will be evident by now referring to Figure 2 which illustrates a schematic wiring diagram of the circuit within the casing 10 of Figure 1.

Referring to Figure 2, the plug 12 and jack 13 are shown connected in parallel to a transmission line comprising the conductors 19 and 20. These conductors each include a serially connected condenser as at 21 and 22, respectively, and terminate in the jack 14 to which th plug 15 of Figure 1 is connected. A pair of relay coils 23 and 24 are tapped off from the transmission lines 19 and 20 on opposite sides of the condensers 21 and 22 as shown. These relay coils are arranged to actuate relay switch arms 23' and 24', respectively. The switches 23' and 24' are connected in series in a power line 25 connected to one side of the secondary of a step down transformer 26. Transformer 26 is provided with a fuse 27 in its primary and arranged to be connected to a conventional A.-C. source.

The other side of the secondary of the transformer 26 connects to a junction point 28. Junction point 28 is connected through a rectifier 29 to a second power line 30 including a serially connected relay coil 31. The other end of the relay coil 31 terminates in a terminal 32 adjacent switch arm 31' arranged to be actuated by relay coil 31. The switch arm 31' is shown in its normally closed position in engagement with another terminal 33 connecting through a branch line 34 to the light 17 and buzzer 18 in parallel. The other side of the light and buzzer connects back to the junction point 28. The push button 16 in Figure 1 is shown connected between the switch arms 23' and 31' and the power line connecting to terminal 32.

A blocking condenser 35 is connected between the power lines 25 and 30 after the rectifier 29 as shown.

In the operation of the monitor control circuit described in Figure 2, when either the incoming call or the outgoing call is connected to the transmission lines 19 and 20 through the plug 12, jack 13, or the jack 14, there is provided a voltage across the transmission line. This voltage is a result of a ringing current and is always available when an incoming call or outgoing call is effected. The various switch arms 23', 24', and 31' are shown in the control portion of the circuit of Figure 2 in their de-energized positions. Thus, both the relay coils 23 and 24 will be energized when the plug and jack connections are made to the transmission lines 19 and 20 thereby closing the switch arms 23' and 24'.

Closure of these switch arms will complete the circuit from the secondary of the transformer 26 through the switch arm 31', branch line 34, to the indicator circuit comprising the light 17 and buzzer 18 in parallel, back to junction point 28 and the other side of the secondary of the transformer 26. Accordingly, the light will light and the buzzer will sound indicating that the connections have been made to the transmission line. The operator then presses the push button 16. Closing of the push button 16 completes a circuit from the secondary of the transformer through the power line 30 and relay coil 31, push button 16, and the closed switch arms 23' and 24', back to the secondary of the transformer thereby operating the relay 31 to throw the switch arm 31' from the terminal 33 to the terminal 32. Movement of the switch arm 31' from the terminal 33 opens the circuit to and de-energizes the light 17 and buzzer 18, and completes a circuit through the relay coil 31 and terminal 32 so that this relay coil is locked in an energized state holding the switch arm 31' to the terminal 32.

The operator will observe when the light 17 goes off and the buzzer 18 stops buzzing and will know that a normal telephone conversation is taking place between the party calling in and the party to whom this call is connected. After the telephone conversation is complete, when either party hangs up, there will be a momentary change in the voltage normally present at the connection points of the transmission lines 19 and 20. Generally, the voltage drops to zero or may be reversed in polarity or fluctuate in some manner such that the relay coil 23 or the relay coil 24 will be momentarily de-energized to result in either the switch arm 23' or the switch arm 24' opening.

When either one or both of the switch arms 23' or 24' open, the circuit through the power line 25, switch arm 31', which is locked onto the terminal 32, and the power line 30, will be broken resulting in de-energization of the relay coil 31. De-energization of the relay coil 31 will result in the switch arm 31' moving to the terminal 33 thus connecting back into the circuit the light 17 and buzzer 18. When the momentary voltage fluctuation as a consequence of hanging up of either party passes, there will be re-established the normal voltage across the transmission lines 19 and 20 which will cause the relays 23 and 24 to again close thus completing a circuit through the indicator and sounding the buzzer and lighting the light. The operator then knows that the call is complete and will unplug the various connections to the transmission lines 19 and 20 thereby de-energizing the voltage on the lines 19 and 20 and resulting in the switch arms 23' and 24' returning to their normally open position. The monitor control unit is then ready for another "patching" connection.

It will be noted that the relay coils 23 and 24 are connected in parallel across the transmission lines 19 and 20 on either side of the condensers 21 and 22. The inherent resistance of these coils is approximately 335 ohms while the capacitance of each of the condensers 21 and 22 is approximately 2 microfarads. The condensers with the resistances constitute a filter serving to block low frequency and D.-C. currents in the transmission lines 19 and 20 to the end that improved transmission of the voice frequencies through the transmission line is effected. The condenser 35 and rectifier 29 serve to provide a rectified current for operating the relay coil 31.

From the foregoing, it will be evident that the present invention has provided a greatly improved monitor control unit which is completely automatic in apprising an operator when a conversation has been completed. It will be noted that the indicators 17 and 18 will be energized when either party hangs up regardless of whether or not the other party should hang up. This is because the voltage fluctuation occurring on one side of the transmission line is isolated from the voltage fluctuation occurring on the other side by the condensers 21 and 22 and thus either relay 23 or relay 24 may be temporarily de-energized to effect an opening in the power line 25. Since both parties normally hang up when a conversation is complete, it will be evident that the present invention will operate substantially as well with only one relay coil connected in parallel across the transmission lines 19 and 20 and one switch arm. In other words, the relay coil 24 and switch arm 24' could be omitted from the circuit and a simple parallel resistance of 335 ohms could be connected across the transmission line to complete the filter circuit. In this event, the only series switches in the power line 25 would be the first mentioned switch arm 23' and the control switch 31'. The indicator lights and buzzer would then be operative when the incoming caller hangs up upon completion of his portion of the conversation.

Other modifications that fall clearly within the scope and spirit of the present invention will readily occur to those skilled in the art. The monitor control unit is, therefore, not to be thought of as limited to the specific examples set forth for illustrative purposes.

What is claimed is:

1. A monitor control unit for use with a telephone switchboard having incoming and outgoing circuits in which voltage is available at at least one of said circuits when answering an incoming call and effecting an outgoing call, said control unit including: a transmission line including input and output terminals for connection to said incoming and outgoing circuits respectively; a source of electrical energy; an indicator; first and second switches connected in series between said source and said indicator; a first coil for operating said first switch connected to said transmission line and responsive to said voltage to close said first switch; a second coil for operating said second switch; a terminal for said second switch, said second coil being connected between said source and said terminal to move said second switch from a position connecting said source to said indicator to a position engaging said second terminal; and a push button switch connected between the junction of said first and second switches, and said terminal.

2. The subject matter of claim 1, in which said transmission line includes series connected condensers; a third switch connected in series with said source and said first switch; and a third coil connected to said transmission line at points on the side of said condensers opposite to the points of connection of said first relay, said third coil being responsive to said voltage to close said third switch.

3. The subject matter of claim 2, in which the resistance of said first and third coils together with the capacitance of said condensers constitutes a high pass filter in said transmission line.

4. The subject matter of claim 2, in which said indicator comprises a light and a buzzer connected in parallel with each other.

5. A monitor control unit for use with a telephone switch board having incoming and outgoing circuits in which voltage is available at at least one of said circuits when answering an incoming call and effecting an outgoing call, said control unit comprising, in combination:

first connecting means for connection to said incoming call; second connecting means for connection to said outgoing call; transmission means connected between said first connecting means and said second connecting means for transmitting intelligence therebetween; a source of electrical energy; indicating means; first and second switch means connected in series between said source and said indicating means, whereby said indicating means is only energized when both said first and second switch means are closed, said second switch means being normally closed and operated to an open position in response to a manual operation; means in circuit with said first switch means for holding said second switch means in open position when said first switch means is closed so that opening of said first switch means releases said second switch means to move to closed position; and means in said transmission means responsive to said voltage for closing said first switch means, whereby an operator is apprised of a change in said voltage to indicate completion of transmission between said incoming call and said outgoing call.

References Cited in the file of this patent

UNITED STATES PATENTS

| | | |
|---|---|---|
| 1,252,216 | Anderson | Jan. 1, 1918 |
| 1,747,833 | King | Feb. 18, 1930 |
| 1,799,916 | Mansfield | Apr. 7, 1931 |
| 2,210,239 | Ulrich | Aug. 6, 1940 |
| 2,719,883 | Reagan | Oct. 4, 1955 |